United States Patent [19]
Carrig et al.

[11] Patent Number: 5,543,960
[45] Date of Patent: Aug. 6, 1996

[54] ELECTRO-OPTIC CRYSTAL MOSAICS FOR THE GENERATION OF TERAHERTZ RADIATION

[75] Inventors: Timothy J. Carrig; Antoinette J. Taylor, both of Los Alamos, N.M.; Kevin R. Stewart, Schenectady, N.Y.

[73] Assignee: The Regents of the University of California, Oakland, Calif.

[21] Appl. No.: 439,393

[22] Filed: May 11, 1995

[51] Int. Cl.⁶ .................................................... G02F 1/35
[52] U.S. Cl. ........................................... 359/326; 372/21
[58] Field of Search .................................. 359/326–332; 372/20–23, 29, 30, 32

[56] References Cited

U.S. PATENT DOCUMENTS

| | | | |
|---|---|---|---|
| 3,824,717 | 7/1974 | Evtuhov et al. | 359/330 |
| 4,510,402 | 4/1985 | Summers et al. | 359/329 |
| 4,757,268 | 7/1988 | Abrams et al. | 372/21 X |
| 4,759,820 | 7/1988 | Calvert et al. | 359/328 X |
| 5,144,630 | 9/1992 | Lin | 372/22 |
| 5,355,247 | 10/1994 | Byer et al. | 359/330 |
| 5,377,043 | 12/1994 | Pelouch et al. | 359/326 |

*Primary Examiner*—John D. Lee
*Attorney, Agent, or Firm*—Milton D. Wyrick; William A. Eklund

[57] ABSTRACT

Apparatus for the generation of high energy terahertz radiation is presented and comprises laser means effective to produce subpicosecond optical pulses and a mosaic comprising a plurality of planar electro-optic crystals fastened together edge to edge in the form of a grid. The electro-optic crystals are in optical communication with the subpicosecond optical pulses, and behave as a single large electro-optic crystal, producing high energy terahertz radiation by way of optical rectification.

12 Claims, 5 Drawing Sheets

1

ELECTRO-OPTIC CRYSTAL MOSAICS FOR THE GENERATION OF TERAHERTZ RADIATION

FIELD OF THE INVENTION

The present invention relates generally to the free space electro-optic frequency conversion of electromagnetic radiation, and, more specifically to the use of crystal mosaics to generate relatively high power terahertz radiation. This invention was made with Government support under Contract No. W-7405-ENG-36 awarded by the U.S. Department of Energy. The Government has certain rights in the invention.

BACKGROUND OF THE INVENTION

The interest within the scientific community in high-power, subpicosecond, terahertz ($10^{12}$ Hz) bandwidth radiation is growing rapidly because of the wide range of applications in which such radiation may be utilized. Among these applications are communications, electronic material characterization, and the development of high-speed optoelectronic devices.

Currently, there are two basic approaches for generating terahertz (THz) beams: (1) using photoconductors and (2) using nonlinear optical frequency conversion techniques. In the photoconductive approach, electrically biased high-speed photoconductors are used as transient current sources for radiating antennas, including elementary Hertzian dipoles, resonant dipoles, tapered antennas, transmission lines, and large-aperture photoconducting antennas. In the nonlinear optical frequency conversion approach, second-order or higher-order nonlinear optical effects in unbiased materials are used. By far, the most important of these nonlinear optics approaches is the optical rectification technique. The optical rectification approach is simpler than the photoconductive approach since no electrical bias is required.

Electro-optic crystals are crystals having an index of refraction that changes in proportion to an applied dc or low-frequency electric field. The magnitude of the effect is proportional to the magnitude of the crystal's electro-optic coefficients.

Prior research has examined several nonlinear materials as terahertz optical rectification media. The materials examined have included organic salts, such as dimethyl amino 4-N-methylstilbazolium tosylate (DAST), traditional electro-optic materials, such as $LiTaO_3$ and $LiNbO_3$, and semiconductors, such as GaAs. To date, the most efficient terahertz medium has been found to be DAST.

Other commonly used electro-optic materials include $NH_4H_2PO_4$ (Ammonium dihydrogen phosphate or ADP), $KH_2PO_4$ (Potassium dihydrogen phosphate or KDP), and CdTe (Cadmium telluride). Still more materials which are structurally similar to ADP include Deuterated KDP or KD*P, rubidium dihydrogen phosphate or RDP, ammonium dihydrogen arsenate or ADA, potassium dihydrogen arsenate or KDA, rubidium dihydrogen arsenate or RDA, cesium dihydrogen arsenate or CDA, and deuterated CDA. Materials which are structurally similar to $LiNbO_3$ include barium titanate or $BaTiO_3$, and lithium iodate or $LiIO_3$. Materials structurally similar to CdTe include zinc sulfide or ZnS, zinc telluride or ZnTe, and zinc setenide or ZnSe. Other materials which might also serve as electro-optic material include quartz, CuCl, InAs, InP, and GaP.

In this method, the nonlinear material is illuminated with ultrashort laser pulses, causing a time-dependent polarization to be created in the material by way of the electro-optic effect. This induced polarization is proportional to the intensity of the excitation pulse, and produces radiation of electromagnetic waves having a terahertz bandwidth. With a suitable electro-optic material, the amplitude of the resulting terahertz field is controlled by the intensity of the optical excitation beam. In turn, this intensity is a result of the pulsewidth, energy, and spot size of the beam.

The only problem with this method is that at high optical intensities, the efficiency of the rectification mechanism may decrease due to competing nonlinear effects. The incident optical intensity at which these competing mechanisms will occur is material dependent. Testing has indicated that, with DAST, for pulsewidths on the order of 215 fs, the saturation in rectification efficiency became pronounced at fluences greater than 20 $mJ/cm^2$. This saturation is directly related to the size of the DAST crystal for a given excitation energy. Therefore, in order to generate high energy terahertz beams, it is necessary to use large aperture crystal emitters. However, the problem with creating large aperture electro-optic crystals is that large, optical quality electro-optic crystals cannot be easily or efficiently grown. The typical optical quality DAST crystal can be grown as platelets up to approximately 5 mm by 5 mm by 1 mm in size.

It is therefore an object of the present invention to provide a large aperture electro-optic emitter for use in generating terahertz radiation.

It is another object of the present invention to provide large aperture electro-optic emitters made as a mosaic of individual electro-optic crystals.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

In accordance with the present invention, there is provided an apparatus for the generation of high energy terahertz radiation comprising laser means effective to produce subpicosecond optical pulses, and a mosaic comprising a plurality of planar electro-optic crystals fastened together edge to edge, each of the plurality of planar electro-optic crystals oriented so that its molecular dipole axis is oriented with adjacent of the plurality of planar electro-optic crystals, in the form of a grid in optical communication with the subpicosecond optical pulses. Wherein the plurality of planar electro-optic crystals behave as a single large electro-optic crystal and produce high energy terahertz radiation by way of optical rectification.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings.

3 is a plot of peak terahertz field strength versus fluence for a mosaic of DAST electro-optic crystals according to the present invention.

DETAILED DESCRIPTION

The present invention provides an aperture which allows high power terahertz radiation to be produced through optical rectification. This aperture, much different from prior electro-optic apertures, is made of a plurality of individual electro-optic crystals joined together to form a mosaic, instead of only a single crystal. It allows the simple optical rectification method of generating terahertz radiation to produce higher terahertz energy outputs than is possible with single, smaller sized electro-optic crystals. The understanding of the invention will be aided through review of the drawings.

Figure 1:
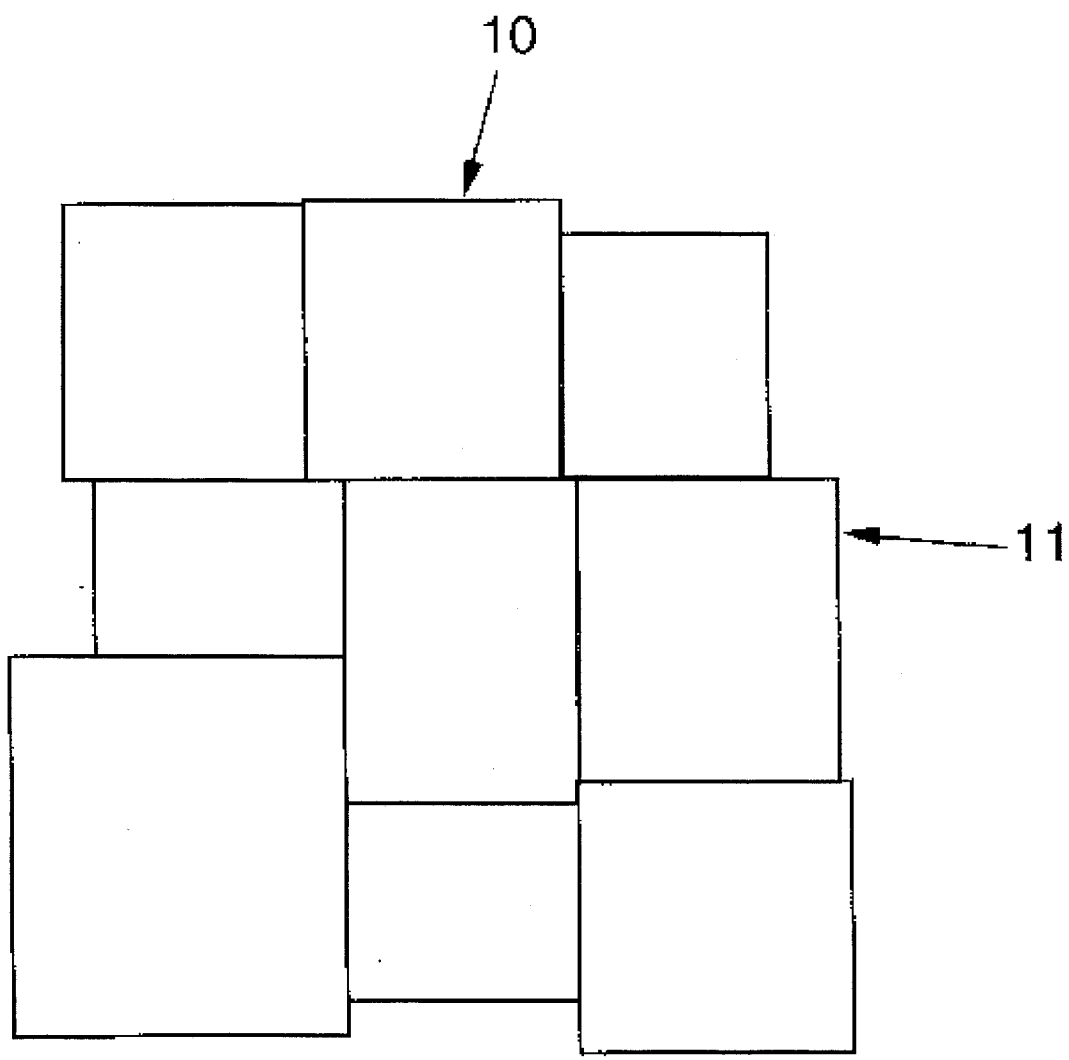
FIG. 1 is a top view of a mosaic of individual electro-optic crystals according to the present invention.

In FIG. 1, a plan view of one embodiment of the present invention is illustrated. Here, mosaic 10 is shown comprised of individual electro-optic crystals 11 which are of arbitrary size. Many of the newly discovered electro-optic crystals 11, such as DAST, can be successfully grown to a size of approximately 5 mm square by 1 mm thick.

Electro-optic crystals 11 are placed edge to edge, each electro-optic crystal 11 having its molecular dipole axis aligned with the molecular dipole axes of adjacent electro-optic crystals 11, and bound together with a transparent optical adhesive. In doing this, because of the small dimensions of electro-optic crystals 11, it may be necessary to mount them to a transparent substrate, such as glass. Thicker electro-optic crystals 11 could be used in a free standing arrangement inside a frame. In either case, a transparent optical adhesive, such as NORLAND 61®, could be used to fasten electro-optic crystals 11 to each other or to a substrate. The main requirement for the adhesive is that it be transparent at the wavelength of the laser pulses utilized.

In optical rectification, the output energy of terahertz radiation from an electro-optic crystal is proportional to the intensity of the incident optical pulse. Therefore, since the maximum incident intensity is limited by either a material's properties, such as the material's damage threshold, or the onset of competing nonlinear effects that result in saturation of the optical rectification efficiency, then the total terahertz radiation output will be dependent on crystal size. Because of this, output power is limited in a single electro-optic crystal 11 of any given size.

For many of the newly discovered crystals, it may be extremely difficult and expensive to grow optical quality crystals in sizes larger than that stated above, in order to obtain the higher energy output necessary for some applications of terahertz radiation. It is for this reason that the present invention provides a method for increasing the area of an electro-optic aperture by combining individual electro-optic crystals 11 to form a mosaic 10.

The thickness of electro-optic crystals 11 is not critical, since the optical rectification effect takes place on the surface of electro-optic crystals 11. If desired, after electro-optic crystals 11 have been grown, they can be processed by sanding or other means in order to size electro-optic crystals 11 so that they fit properly together. However, testing has shown that mosaic 10 performs properly even with visually apparent gaps between adjacent electro-optic crystals 11.

Most optical processes involving crystals require perfect single crystals. The reason for this is that material imperfections in the crystals scatter light and distort the wavefront of the light beam interacting with the crystalline material. This should also be the case for interfaces between adjacent crystals. That mosaic 10 is capable of operating to produce terahertz radiation, even with rough interfaces between individual electro-optic crystals 11, is a very unexpected result.

The type of laser used to excite electro-optic crystals 11 is not overly important as long as it is capable of producing a train of extremely short pulses ( a 5 ps maximum) at a wavelength in the transparency range of the electro-optic crystal 11 that is being used. For the DAST material, lasers operating at wavelengths of 750 nm to 1600 nm are acceptable. Other crystals may have a different transparency range. The excitation beam can be focused onto either a single electro-optic crystal 11, or onto the entire mosaic 10 depending on the energy output desired.

EXAMPLE

In one experiment, four identically oriented electro-optic crystals 11, each approximately 0.6 mm thick, and 5 mm by 5 mm square were formed into a 2×2 grid, and fastened onto a glass slide using NORLAND 61® optical epoxy. For this experiment, electro-optic crystals 11 were rough-cut and unpolished, and small gaps were visible between adjacent electro-optic crystals 11. However, care was taken to align the molecular dipole axis of each electro-optic crystal 11 with the molecular dipole axes of its adjacent electro-optic crystals 11.

Electro-optic crystals 11 were excited by 810 nm, 215 fs duration, Gaussian-shaped laser pulses produced by a Ti:sapphire chirped-pulse amplifier system operating at a 5 Hz repetition rate. Initially, single crystal tests were performed by focusing the excitation beam to a 2.5 mm diameter spot ($1/e^2$) on one electro-optic crystal 11. Later, the beam was expanded to 10 mm in diameter for testing of the entire mosaic 10.

The terahertz radiation from electro-optic crystals 11 was detected by 2.5 mm-gap radiation-damaged silicon-on-sapphire (RDSOS) photoconducting antenna which was optically gated by pulses from the Ti:sapphire laser system. An optical delay line in the gating pulse pathway was used to measure the temporal profile of the radiated terahertz signal in order to verify that data was taken at the peak of the radiated electric field.

Mosaic 10 was placed approximately 15 mm from the photoconducting antenna. As the short wavelength response of the detector is approximately 1 mm, measurements were made in the far field (defined as $d^2/8\lambda$, where d is the diameter of the terahertz beam, and $\lambda$ is the wavelength of the detected light) for both the 2.5 mm and 10 mm diameter excitation beams. To verify that measurements were made in the far field, it was noted that the terahertz waveforms obtained for both the 2.5 mm and 10 mm diameter excitation beams were identical.

Figure 2:
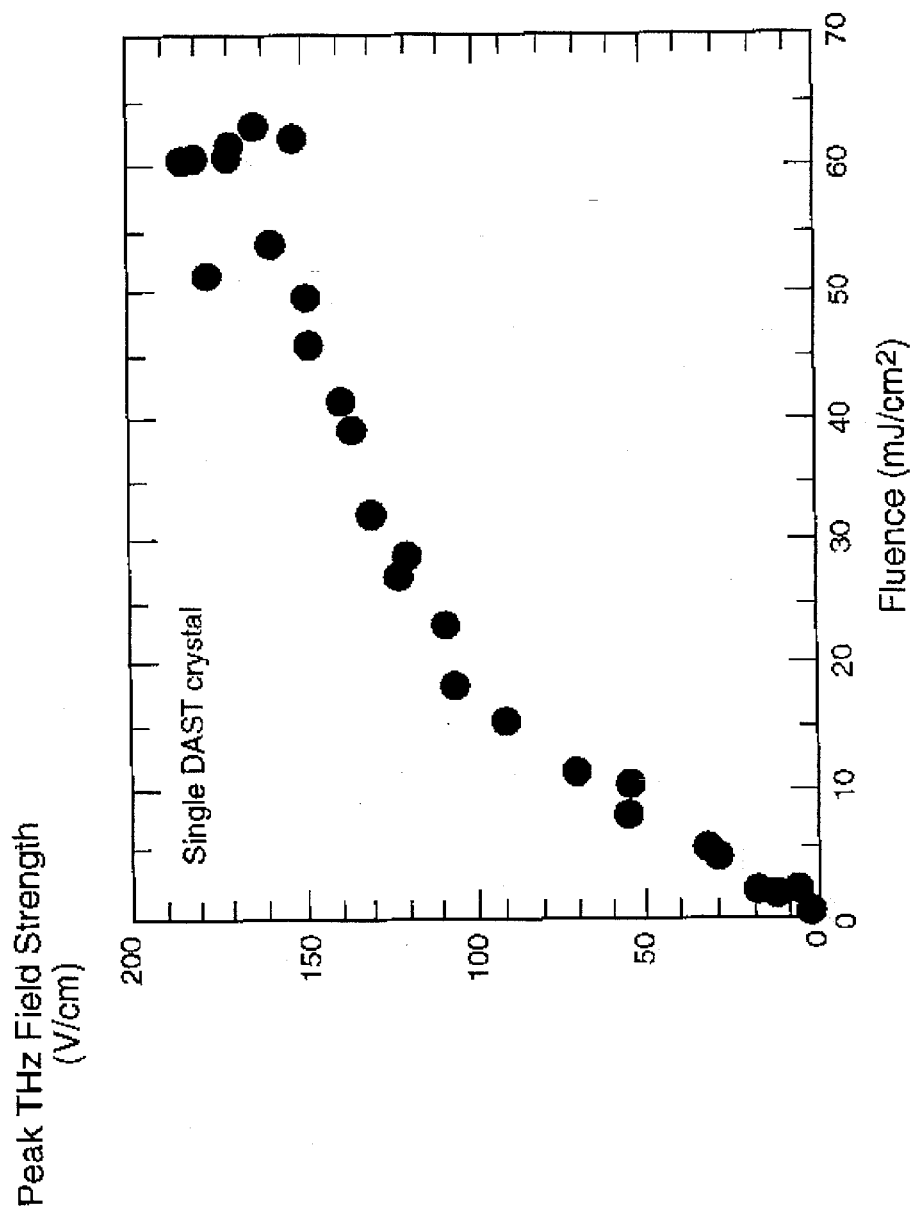
FIG. 2 is a plot of peak terahertz field strength versus fluence for a single DAST electro-optic crystal. FIG.
Figure 3:
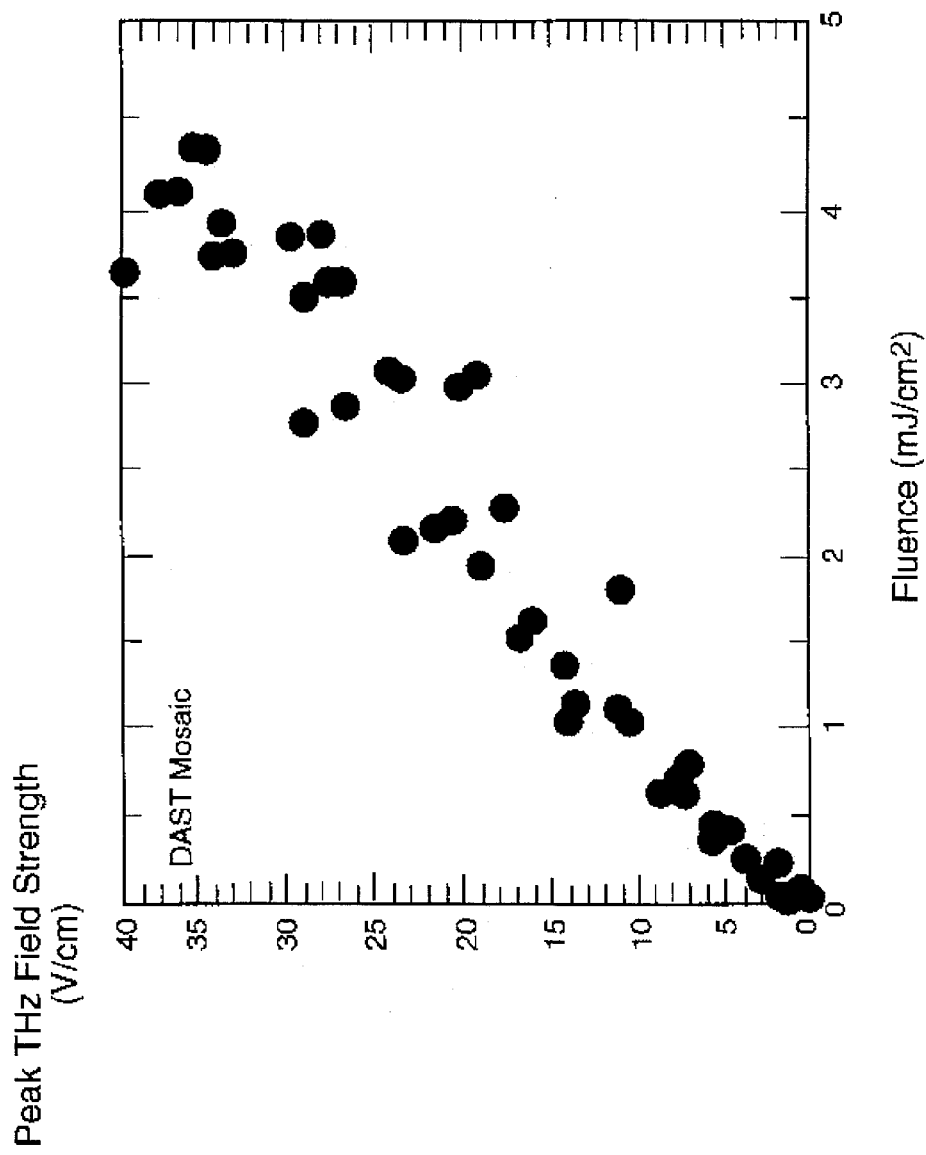

FIGS. 2 and 3 illustrate the peak radiated terahertz electric field strengths plotted as a function of incident excitation fluence both for a single electro-optic crystal 11 (FIG. 2) and for the entire mosaic 10 (FIG. 3). By plotting optical fluence, the factor of sixteen difference in excitation beam area is automatically taken into account. The fact that the results shown in FIGS. 2 and 3 are approximately identical indicates that mosaic 10 has effectively the same rectification efficiency as a single large electro-optic crystal.

Next, the spatial profile of the terahertz beam generated by mosaic 10 was measured. This was accomplished by scanning the RDSOS detector across the middle of the emitter in the horizontal plane. In order to maintain a constant detector calibration, the gating pulse light was first coupled into a 1000 µm core diameter silica fiber using a 5 cm focal length lens. The fiber was then attached to the detector housing so that the detector could be translated without changing the position of the gating pulse illumination.

Figure 4:
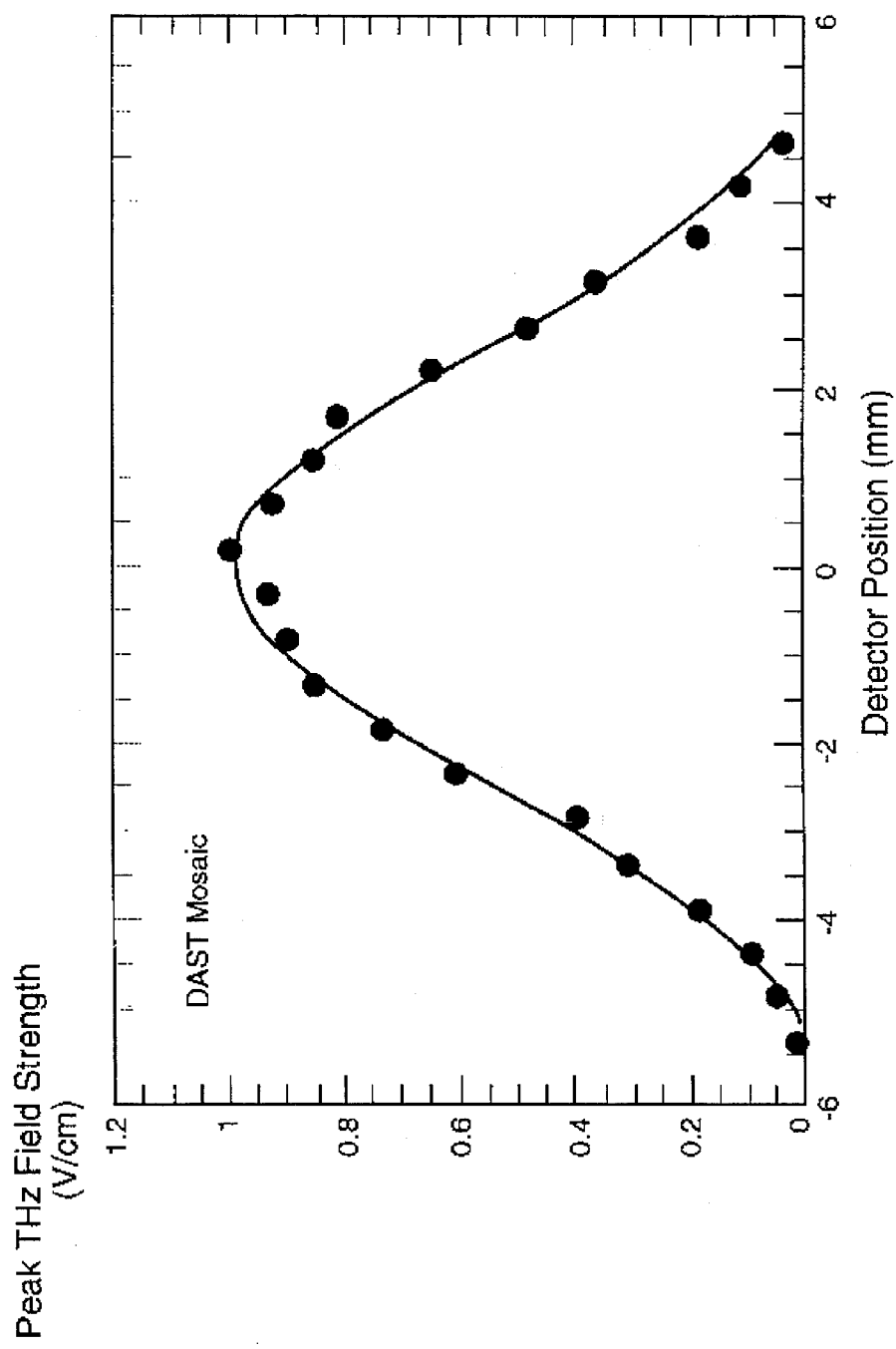
FIG. 4 is plot of normalized peak terahertz field strength versus the position of a detector for the mosaic of the present invention, illustrating the nearly Gaussian profile of the radiated terahertz radiation.

FIG. 4 illustrates the measured spatial profile of the terahertz beam (dots), and a Gaussian curve fit to the data (solid line), assuming a full width at half maximum (FWHM) of 5.2 mm. Despite the obvious structural irregularities in mosaic 10, the radiated terahertz beam displays a nearly perfect Gaussian profile, indicating that it neatly mimics the spatial profile of the optical excitation beam.

Using the results of the previous example, the optimum size mosaic 10 for a given excitation beam energy and pulsewidth can be determined. The optimum size for mosaic 10 is dependent on the specific material used. From FIG. 2, it can be seen that the terahertz field strength monotomically increases with increasing excitation fluence, indicating that it is possible to generate higher field strengths simply by increasing the excitation fluence. However, the terahertz field strengths produced are limited by the decreasing rectification efficiency and by the damage threshold of the particular electro-optic crystal 11.

Figure 5:
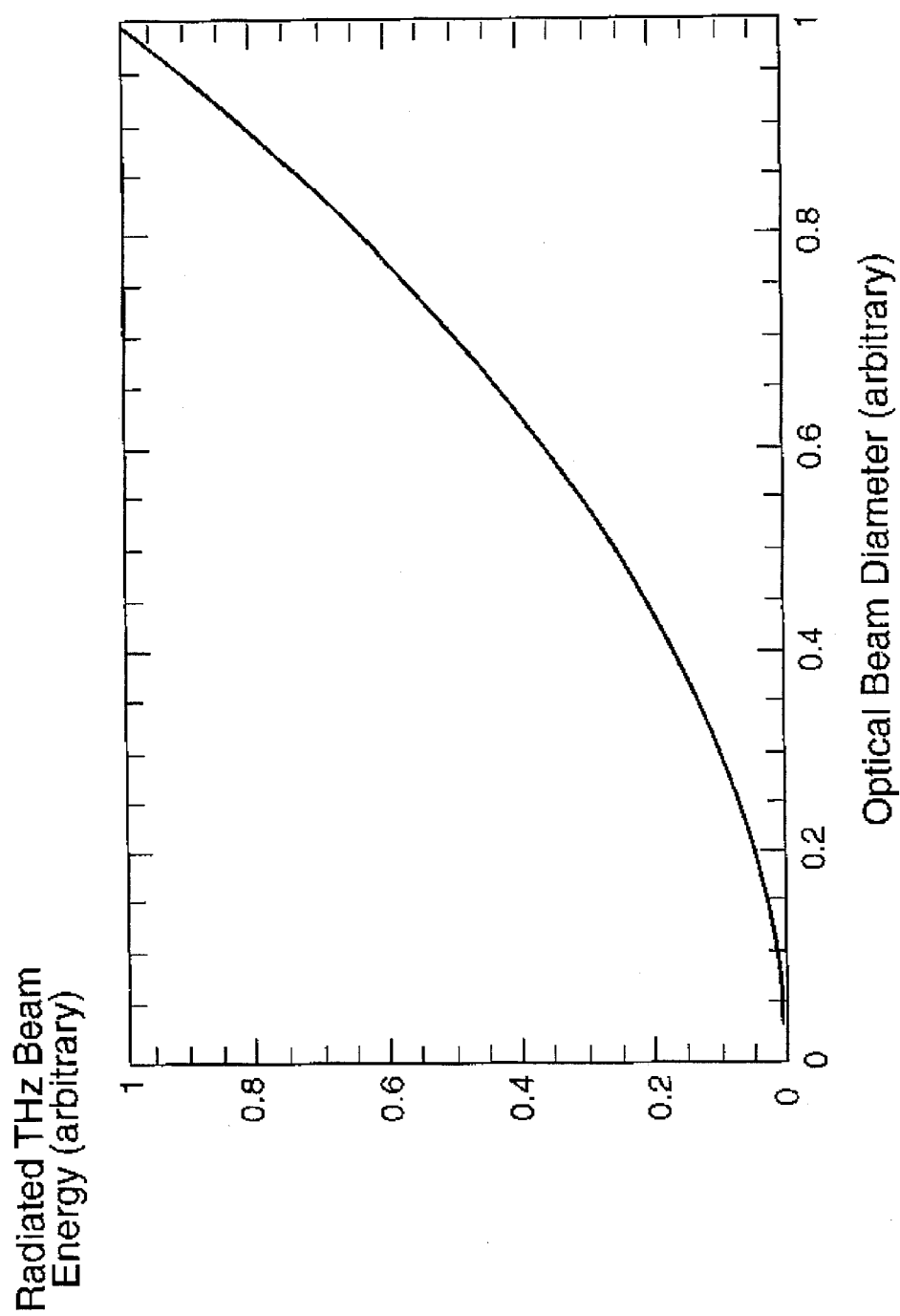
FIG. 5 is a plot in arbitrary units of optical beam diameter versus terahertz beam energy.

With the determination of a reasonable limit on laser fluence, it is possible to calculate the focusable terahertz energy that can be produced by a certain size mosaic 10 emitter as a function of excitation beam energy for any given electro-optic material. In FIG. 5, the Radiated THz Beam Energy from mosaic 10 is plotted against Optical Beam Diameter, in arbitrary units. This plot illustrates the square law power scalability of mosaic 10 for a constant incident optical beam energy density.

Electro-optic crystals 11 may comprise any electro-optic crystal which will provide the output energy of terahertz radiation needed for a particular application. Comparisons of lithium niobate ($LiNbO_3$), lithium tantalate ($LiTaO_3$), which have transparency ranges of approximately 500 nm to 5000 nm, and the organic salt dimethyl amino 4-N-methylstilbazolium tosylate (DAST) have indicated that $LiNbO_3$ and $LiTaO_3$ emitters generate a peak electric field which increases linearly with increasing optical fluence up to at least 60 $mJ/cm^2$, and that DAST emitters generate a peak electric field which exhibits a sublinear behavior, and begins to saturate at fluences greater than 20 $mJ/cm^2$. It was found that DAST was the most efficient terahertz rectification medium.

It should be recognized that there are many other electro-optic materials which could be used with the present invention. Among these are $NH_4H_2PO_4$ (Ammonium dihydrogen phosphate or ADP), $KH_2PO_4$ (Potassium dihydrogen phosphate or KDP), and CdTe (Cadmium telluride). Still more materials which are structurally similar to ADP include Deuterated KDP or KD*P, rubidium dihydrogen phosphate or RDP, ammonium dihydrogen arsenate or ADA, potassium dihydrogen arsenate or KDA, rubidium dihydrogen arsenate or RDA, cesium dihydrogen arsenate or CDA, and deuterated CDA. Materials which are structurally similar to $LiNbO_3$ include barium titanate or $BaTiO_3$, and lithium iodate or $LiIO_3$. Materials structurally similar to CdTe include zinc sulfide or ZnS, zinc telluride or ZnTe, and zinc selenide or ZnSe. Other materials which might also serve as electro-optic material include quartz, CuCl, GaAs, InAs, InP, and GaP.

The foregoing description of the embodiments of the invention have been presented for purposes of illustration and description. It is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. Apparatus for the generation of high energy terahertz radiation comprising:

laser means effective to produce subpicosecond optical pulses; and a mosaic comprising a plurality of planar electro-optic crystals fastened together edge to edge in the form of a grid, each of said plurality of planar electro-optic crystals having its molecular dipole axis aligned with the molecular dipole axes of adjacent of said plurality of planar electro-optic crystals, said mosaic being in optical communication with said subpicosecond optical pulses;

wherein said plurality of planar electro-optic crystals behave as a single large electro-optic crystal and produce high energy terahertz radiation by way of optical rectification.

2. The apparatus as described in claim 1, wherein said plurality of electro-optic crystals comprises crystals of dimethyl amino 4-N-methylstilbazolium tosylate (DAST).

3. The apparatus as described in claim 2, wherein said laser means operates at a wavelength between 750 nm and 1600 nm and produces puleswidths no longer than 5 ps.

4. The apparatus as described in claim 2, wherein said laser means comprises a Ti:sapphire laser.

5. The apparatus as described in claim 4, wherein said Ti:sapphire laser operates at a wavelength of 810 nm and produces pulses having a pulsewidth of approximately 215 fs.

6. The apparatus as described in claim 1, wherein said plurality of electro-optic crystals comprises crystals of lithium niobate ($LiNbO_3$).

7. The apparatus as described in claim 1, wherein said laser means operates at a wavelength between 500 nm and 5000 nm and produces puleswidths no longer than 5 ps.

8. The apparatus as described in claim 1, wherein said plurality of planar electro-optic crystals comprise a combination of one or more electro-optic crystal from the group consisting of dimethyl amino 4-N-methylstilbazolium tosylate, lithium tantalate ($LiTaO_3$) and lithium niobate ($LiNbO_3$).

9. The apparatus as described in claim 1, wherein said plurality of electro-optic crystals are mounted onto a substrate.

10. The apparatus as described in claim 1, wherein said plurality of electro-optic crystals are mounted into a frame.

11. The apparatus as described in claim 1, wherein said plurality of electro-optic crystals comprises crystals of lithium tantalate ($LiTaO_3$).

12. The apparatus as described in claim 11, wherein said laser means operates at a wavelength between 500 nm and 5000 nm and produces puleswidths no longer than 5 ps.

* * * * *